United States Patent
Comisky et al.

(10) Patent No.: US 6,801,985 B1
(45) Date of Patent: Oct. 5, 2004

(54) DATA BUS USING SYNCHRONOUS FIXED LATENCY LOOP INCLUDING READ ADDRESS AND DATA BUSSES AND WRITE ADDRESS AND DATA BUSSES

(75) Inventors: David A. Comisky, Plano, TX (US); Joseph Zbiciak, North Richland Hills, TX (US)

(73) Assignee: Texas Instruments Incorporated, Dallas, TX (US)

( * ) Notice: Subject to any disclaimer, the term of this patent is extended or adjusted under 35 U.S.C. 154(b) by 944 days.

(21) Appl. No.: 09/637,491

(22) Filed: Aug. 11, 2000

Related U.S. Application Data (60) Provisional application No. 60/153,390, filed on Sep. 10, 1999.

(51) Int. Cl.[7] .............................................. G06F 12/00
(52) U.S. Cl. ........................ 711/149; 709/216; 710/117
(58) Field of Search ........................ 711/149, 168–169, 711/150; 709/216, 217, 231, 232, 238, 212; 710/33

(56) References Cited

U.S. PATENT DOCUMENTS

| | | | | |
|---|---|---|---|---|
| 4,071,706 A | * | 1/1978 | Warren | ........................ 370/463 |
| 4,573,120 A | * | 2/1986 | Ichimiya et al. | ................ 710/1 |
| 4,703,451 A | * | 10/1987 | Calabrese | .............. 340/825.52 |
| 4,814,761 A | * | 3/1989 | Takahashi et al. | ........ 340/825.2 |
| 5,948,089 A | * | 9/1999 | Wingard et al. | ............ 710/107 |
| 6,073,233 A | * | 6/2000 | Chapman | ........................ 713/1 |
| 6,654,834 B1 | * | 11/2003 | Robertson et al. | .......... 710/107 |

* cited by examiner

Primary Examiner—Nasser Moazzami
(74) Attorney, Agent, or Firm—Robert D. Marshall, Jr.; W. James Brady, III; Frederick J. Telekcy, Jr.

(57) ABSTRACT

Data transfer between a master node (300) and plural memory nodes (301–308) follows a synchronous fixed latency loop bus (255). Each memory node includes bus interface (311–318) which passes command, write data, write address, and read data and read address to a next memory node in the loop. Each memory node performs a read from its memory at the specified address if a read command is directed to it. Each memory node performs a write to its memory at the specified address if a write command is directed to it. Simultaneously read and write to a single node is prohibited. This configuration provides a fixed latency between the issue of a read command and the return of the read data no matter which memory node is accessed. This configuration prevents collision of returning read data and of incoming write data. This configuration provides fixed loading to each stage regardless of the number of memory nodes. Thus the design of large systems operating at high speeds is simplified.

21 Claims, 6 Drawing Sheets

DATA BUS USING SYNCHRONOUS FIXED LATENCY LOOP INCLUDING READ ADDRESS AND DATA BUSSES AND WRITE ADDRESS AND DATA BUSSES

CROSS REFERENCE TO RELATED APPLICATIONS

This application claims priority under 35 USC §119(e)(1) of Provisional Application No. 60/153,390, filed Sep. 10, 1999.

This application is related to the following co-pending patent applications:

U.K. Patent Application No. 00303373.5, filed Apr. 16, 1999, entitled TRANSFER CONTROLLER WITH HUB AND PORTS ARCHITECTURE; and U.K. Patent Application No. 9916705, filed Jul. 9, 1999, entitled DATA BUS USING SYNCHRONOUS FIXED LATENCY LOOP.

TECHNICAL FIELD OF THE INVENTION

The technical field of this invention is microprocessors and digital signal processor performing data exchange between memory ports of a multiple port device.

BACKGROUND OF THE INVENTION

The present invention deals with the data transfer connecting various memory port nodes as applied to the transfer controller with hub and ports architecture. The transfer controller with hub and ports is the subject of U.K. Patent Application No. 00303373.5 filed Apr. 16, 1999, entitled TRANSFER CONTROLLER WITH HUB AND PORTS ARCHITECTURE. The transfer controller with hub and ports is a significant basic improvement in data transfer techniques in complex digital systems and provides many useful features, one of which is the internal memory port which allows connection of a virtually unlimited number of processor/memory nodes to a centralized transfer controller. The centralized transfer controller must be able to transfer data from node to node with performance relatively independent of how near or remote a node might be from the transfer controller itself. To clarify the problem solved by the present invention, it is helpful to review the characteristics, architecture, and functional building blocks of the transfer controller with hub and ports.

While direct memory access (DMA) techniques are a powerful tool in a digital signal processor system, they have their limitations. The fundamental limitation of a conventional direct memory access engine is that adding additional channel capacity requires additional hardware (in general, a replication of a complete channel). Some optimizations can be made in this area, such as sharing registers between multiple channels, but in general, the following rule holds: N-channels costs N times as much as a single channel.

Conventional direct memory access techniques read from a source, and subsequently pass the data on to a destination. The source transfers will initially proceed at full rate. However, if the source has higher data transfer bandwidth than the destination, this data will backlog within the direct memory access engine. This will eventually slow the rate at which source transfers are issued. Thus the source data transfer bandwidth is effectively restricted to that of the destination. If another channel has a different source port and a different destination port, there are no conflicts using the conventional read driven approach. However, if the source port of the other channel is the same, the other channel could not be processed. This makes for inefficiency. In a device that supports only one transfer at a time, this is acceptable. However, the transfer controller with hub and ports device supports multiple concurrent transfers and other provisions must be made. A normal transfer process in the known art starts by reading data from the source and then writing it to the destination. The source read drives the process in that it occurs first, and everything follows as a consequence.

With a conventional read driven approach, the source will start reading data, which will be passed to the destination. However, if the destination is slow, a backlog of data waiting to be written will eventually cause the source read process to stall because it will not have anywhere to put the data read. With only one channel this is acceptable, but if there are multiple channels, conflicts occur. The source for this channel is stalled and cannot respond to more read requests. However, it is desirable to be able to service a different channel instead.

These basic limitations to conventional data transfer techniques led to the initial development of the transfer controller with hub and ports. The transfer controller with hub and ports is a unique mechanism which consolidates the functions of a direct memory access and other data movement engines in a digital signal processor system (for example, cache controllers) into a single module.

Consolidation of such functions has both advantages and disadvantages. The most important advantage of consolidation is that it will, in general, save hardware since multiple instantiations of the same type of address generation hardware will not have to be implemented.

On a higher level, it is also advantageous to consolidate address generation since it inherently makes the design simpler to modify from a memory-map point of view. For example, if a peripheral is added or removed from the system, a consolidated module will be the only portion of the design requiring change. In a distributed address system (multi-channel direct memory access for example), all instances of the direct memory access channels would change, as would the digital signal processor memory controllers.

Fundamental disadvantages of the consolidated model, however, are its inherent bottle necking, resulting from conflicting multiple requests, and its challenge to higher clock rates. Additionally, there is in general an added complexity associated with moving to a consolidated address model, just because the single module is larger than any of the individual parts it replaces.

The transfer controller with hub and ports, to which this invention relates, is a highly parallel and highly pipelined memory transaction processor. This transfer controller with hub and ports serves as a backplane to which many peripheral and/or memory ports may be attached.

SUMMARY OF THE INVENTION

This invention allows for the connection of the multiple memory port nodes of multi-processor devices to be connected in a manner which preserves read latency irrespective of how near or remote a node may be from a centralized data transfer controller such as the transfer controller with hub and ports architecture upon which it is based. Using this manner of connection, referred to as synchronous fixed latency loop, the issue of a read command and retrieval of data at the memory port requesting the data transfer requires a fixed number of clock cycles for any memory port on the data transfer bus. This allows for more straightforward implementation of the read-then-write operations which makes up the data transfer process. Such a device is described in U.K. Patent Application No. 9916705, filed Jul. 9, 1999, entitled DATA BUS USING SYNCHRONOUS FIXED LATENCY LOOP.

The present invention further refines the synchronous fixed latency loop, allowing higher transaction throughput by allowing both a read and a write operation to be passed through the successive nodes of the synchronous fixed latency loop on each clock cycle. This refinement is subject to the stipulation that the read node address must be different from write node address, as a given node will not be configured to carry out both a read and a write simultaneously on occurrence of a given clock.

The refinement further requires that an additional data transfer word must be added to the word group, which circulates through the data transfer loop. In particular, the synchronous fixed latency loop was originally transferred a command/address word, a read data word and a write data word. The single address word allowed for only a read or a write. This invention adds a second address word. Thus the synchronous fixed latency loop of this invention transfers a read command/address word, a read data word, a write command/address word and a write data word. The additional address enables simultaneous transmission of both read and write commands. This doubles the peak data transfer bandwidth.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
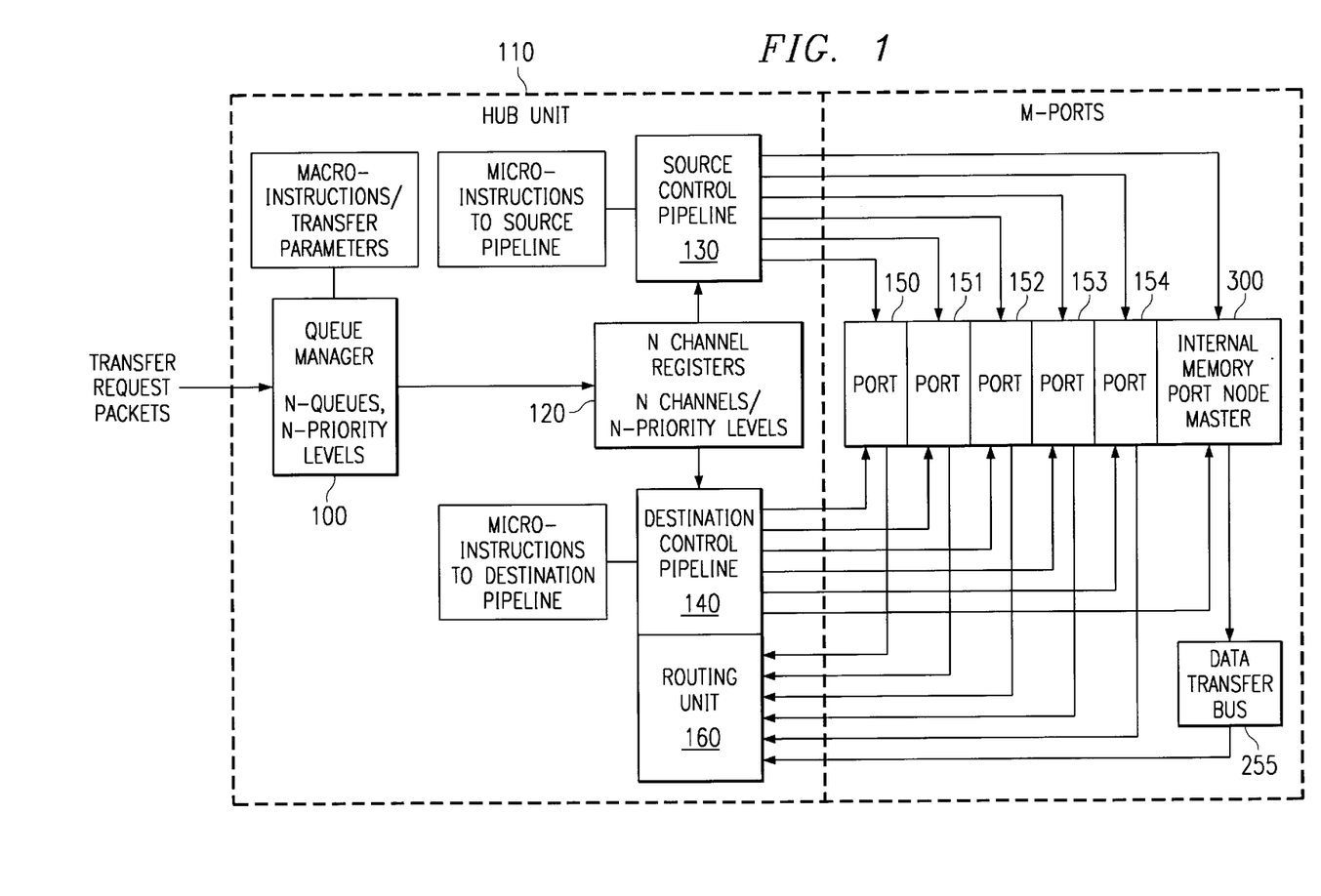
FIG. 1 illustrates a block diagram of the basic principal features of a transfer controller with hub and ports architecture transfer controller with hub and ports.

FIG. 1 illustrates a block diagram of the basic features of the transfer controller with hub and ports. The transfer controller with hub and ports is basically a data transfer controller which has at its front end portion, a queue manager 100 receiving, prioritizing, and dispatching data in the form of transfer request packets. This queue manager 100 connects within the hub unit 110 to the channel registers 120. Channel registers 120 receives the data transfer request packets and processes them first by prioritizing them and assigning them to one of the N channels. Each channel represents a priority level. These channel registers 120 interface with the source control pipeline 130 and destination control pipeline 140. These are address calculation units for source (read) and destination (write) operations.

Outputs from these pipelines are broadcast to M Ports (six shown in FIG. 1 as 150 through 154 and 300). The ports 150 to 154 and 300 are clocked either at the main processor clock frequency or at a lower external device clock frequency. Read data from one port, e.g. port 150, having a destination write address of port 153 is returned to the hub destination control pipeline through the routing unit.

The transfer controller with hub and ports, to which this invention relates, introduces several new ideas supplanting the previous transfer controller technology. First, it is uniformly pipelined. In the previous transfer controller designs, the pipeline was heavily coupled to the external memory type supported by the device. In the preferred embodiment, the transfer controller with hub and ports contains multiple external ports, all of which look identical to the hub. Thus peripherals and memory may be freely interchanged without affecting the transfer controller with hub and ports. Secondly, the transfer controller with hub and ports concurrently executes transfers. That is, up to N transfers may occur in parallel on the multiple ports of the device, where N is the number of channels in the transfer controller with hub and ports core. Each channel in the transfer controller with hub and ports core is functionally just a set of registers. These registers track the current source and destination addresses, the word counts and other parameters for the transfer. Each channel is identical, and thus the number of channels supported by the transfer controller with hub and ports is highly scalable. Thirdly, the transfer controller with hub and ports includes a mechanism for queuing transfers up in a dedicated queue RAM.

Figure 2:
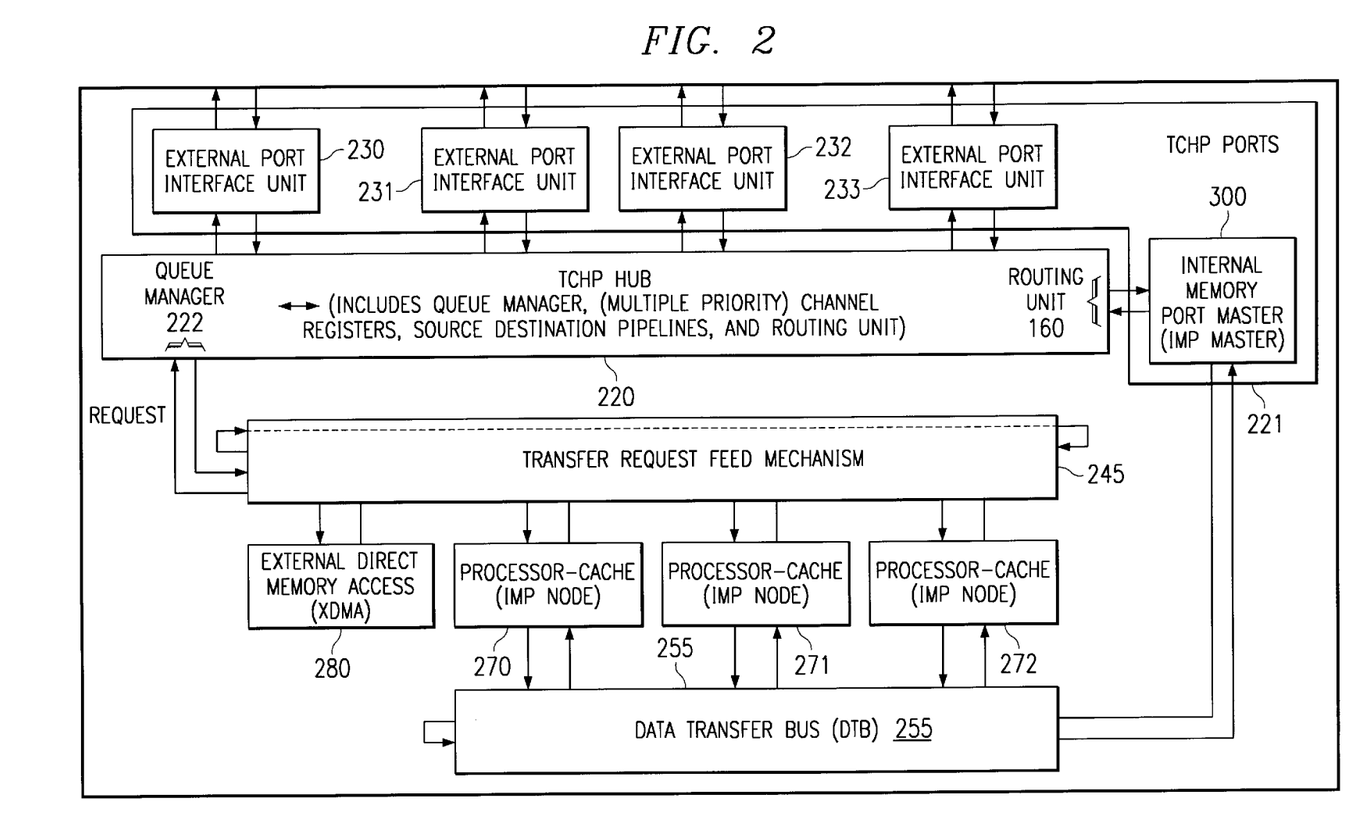
FIG. 2 illustrates the multi-processor machine having a transfer controller with hub and ports architecture functional block relating to this invention, showing from a higher level, the essential elements of the transfer controller with hub and ports and its associated functional units.

FIG. 2 illustrates from a higher level an overview of an multiprocessor integrated circuit employing the transfer controller with hub and ports of this invention. There are four main functional blocks. The transfer controller with hub and ports 220 and the ports including ports external port interface units 230 to 233 and internal memory port 300 are the first two main functional blocks. Though four external port interface units 230, 231, 232 and 233 are illustrated, this is an example only and more or less could be employed. The other two main functional blocks are the transfer request feed mechanism 245 and the data transfer bus (DTB) 255. These are closely associated functional units that are but not a part of the transfer controller with hub and ports 220. Transfer request feed mechanism 245 is coupled to plural internal memory port nodes 270, 271 and 272. Though three internal port nodes 270, 271 and 272 are illustrated, this is an example only and more or less could be employed. Each of these internal memory port nodes preferably includes an independently programmable data processor, which may be a digital signal processor, and corresponding cache memory or other local memory. The internal construction of these internal memory port nodes 270, 271 and 272 is not important for this invention. For the purpose of this invention it sufficient that each of the internal memory port nodes 270, 271 and 272 can submit transfer requests via transfer request feed mechanism 245 and has memory that can be a source or destination for data. Transfer request feed mechanism 245 prioritizes these packet transfer requests in a manner not relevant to this invention. Transfers originating from or destined for internal memory port nodes 270, 271 or 272 are coupled to transfer controller with hub and ports 220 via data transfer bus 255 and internal memory port master 300. FIG. 2 highlights the possible connection of data transfer bus 255 to multiple internal memory port nodes 270, 271 and 272 and the possible connection of multiple transfer request nodes to transfer request feed mechanism 245.

Figure 3:
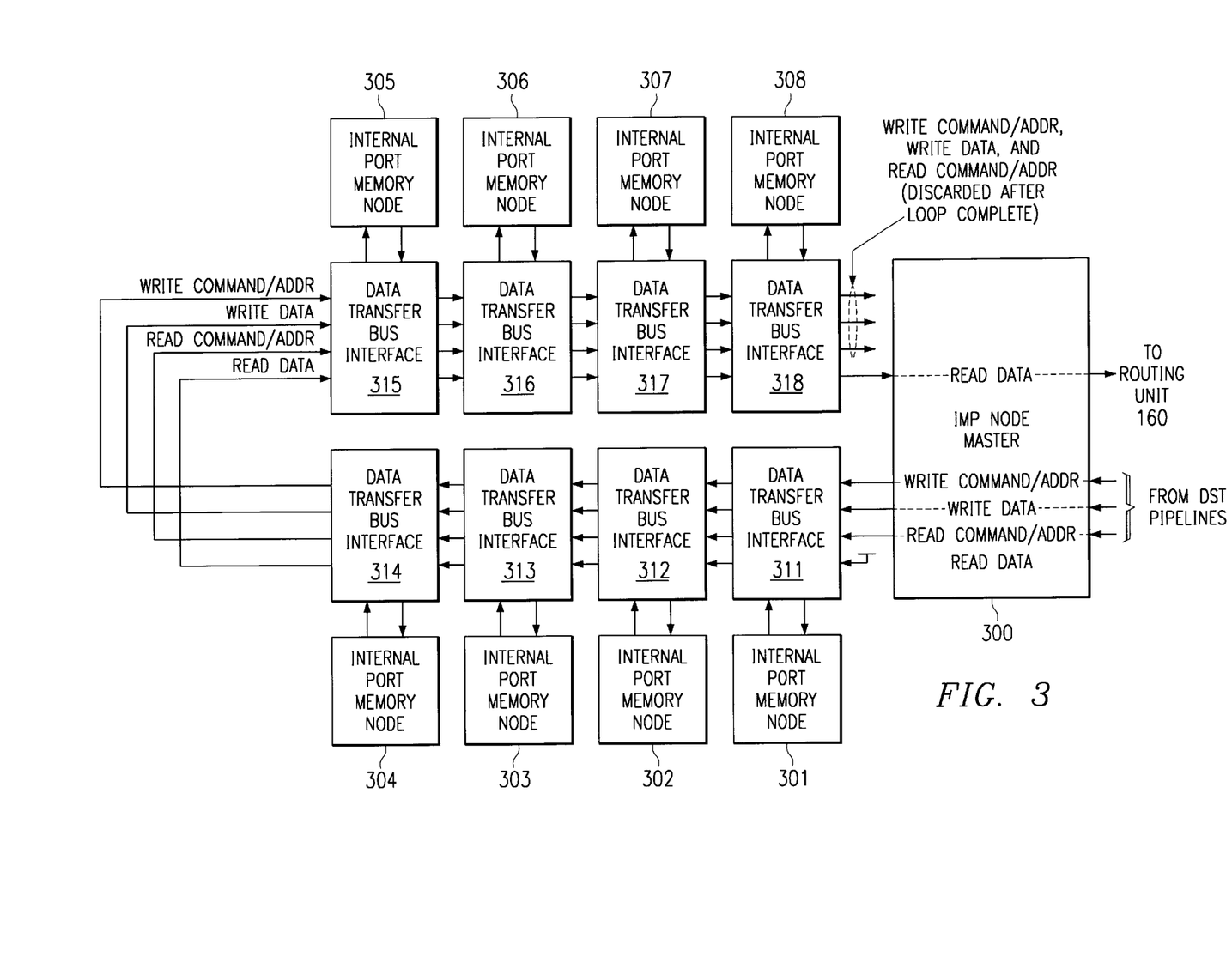
FIG. 3 illustrates the functional block diagram of the synchronous fixed latency loop data bus.

FIG. 3 illustrates an example of the synchronous fixed latency loop of this invention. FIG. 3 illustrates further details of data transfer bus 255. This fixed latency loop includes of multiple synchronous internal memory port nodes 301 to 308, which correspond to internal memory port nodes 270, 271 and 272. Each internal memory port node 301 to 308 includes a corresponding data transfer bus interface 311 to 318. Commands, addresses and data are latched at data transfer bus interfaces 311 to 318. To read data from memory at a particular internal memory port node 301 to 308, a read command must first pass from the internal memory port node master 300 through some number of nodes in the loop until the required internal memory port node is reached. Once accessed, read data is passed back to controller through the remaining nodes back to internal memory port node master 300. The nature of the loop is such that for all memory devices on the loop, the sum of the number of nodes through which the read command passes plus the number of nodes through which the read data passes is a constant. This constant corresponds to the length of the loop.

The synchronous fixed latency loop bus is divided into two paths of equal number of registers and equal latency. The first path transports a write command/address word and a write data word. The second path transports a read command/address word and a read data word. Separate unidirectional data buses for read and write are used. Depending on where in the loop an internal memory port node is, there will be differing numbers of write data delay stages and read data delay stages. However, but the sum of the two will always be constant related to the number of nodes in the loop. Thus read data returns at a pre-determined number of clock cycles after it is requested. Additionally, placing the internal memory port nodes 301 to 308 in a loop prevents conflicts if multiple memory nodes want to drive the bus simultaneously. If all the internal memory port nodes had a dedicated read data bus, there is the possibility that the data from many reads may arrive at internal node master 300 simultaneously. Handling this possibility would add complexity to the bus controller. Within the loop of FIG. 3, all such conflicts are avoided.

Conventionally, a memory interface has a single address bus connected to all the devices accessed. Conventional memory interfaces have either a single bidirectional read/write data bus or independent unidirectional read and write data buses. When the clock speed is high, the number of devices large or the wire lengths are long, in any combination, coordination and control of such a system starts to break down due to inherent wiring delays.

The synchronous fixed latency loop data bus of this invention solves this problem. Command, address and data signals are passed from device to device in a daisy chain fashion, buffered through registers at each device. Thus, the loading on the connections is small and is independent of the number of devices. This allows the clock speed and the number of devices to be increased. A characteristic of this system is that command, address and data take longer to reach nodes farther from the internal memory port master node. This is not a problem for writes. No return is required for writes to any of the internal port memory nodes 301 to 308. However, if read data were simply passed back to the internal memory port node master 300 through the loop of registers, the read latency (time between the internal memory port node master issuing the read address, and the data being returned) would vary according to how far the device was from the internal memory port. This is unacceptable.

To solve this, the read data route continues along the loop in the same direction. This eventually returns to internal memory port node master 300 at the end of the loop. The number of links in the loop from the read address issue to data return is constant producing a constant real latency. The first device to receive the address will have the most delay stages in its read data return path, whereas the last device to receive the address will have the least delay stages in its read return path. The sum of the number of address delay stages plus the number of read data delay stages will be the same for all devices. This sum corresponds to the length of the loop. Assuming that the read latency within each node is constant, then the read latency will be a constant for all internal memory port nodes. This read latency depends upon the absolute number of devices. It is easy to adjust for this read latency in the internal memory port processor.

On each clock cycle internal memory port node master 300 may issue both a read command and a write command. A read command requests a particular internal memory node 301 to 308 to return the data at a specified read address. A write command requests a particular internal memory node 301 to 308 to store the write data at a specified write address. Some manner of distinguishing between the internal memory port nodes 301 to 308 for reads and writes is assumed. In addition, each internal memory port node 301 to 308 is assumed to include a quantity of addressable memory. These objectives could be achieved by assigning a node number to each internal memory port node 301 to 308. The memory of each internal memory port node 301 to 308 would be addressable by a supplied address, which could include separate address spaces. Alternatively, each internal memory port node 301 to 308 could be assigned a subset of a unified address space. The intended internal memory port node is determined based upon which subset of memory is addressed. In the preferred embodiment each internal memory port node 301 to 308 consists of a digital signal processor core and corresponding instruction cache memory and data cache memory/random access memory. Each such digital signal processor preferably includes the same amount of memory and the node is determined by the high order bits of the memory address.

In the preferred embodiment internal memory port node 300 may issue 4 words each cycle. These four words are a write command/address word, a write data word, a read command/address word and a read data word. As illustrated in FIG. 3, these four words are routed on different paths in the loop of internal memory port nodes 301 to 308. In the preferred embodiment, these four words have the following bit-by-bit makeup. The write command/address word includes a number of bits indicating a write command, status, byte strobes and such and the write address. The write address preferably is 29 most significant bits of a 32 bit address. Data transfer bus 255 preferably always transfers 64 bits. The lower 3 bits of the byte write address are assumed to be "000" corresponding to aligned double word boundaries. As previously stated, the write data includes 64 bits. The read command/address word includes a number of bits indicating a read command, status, byte strobes and such and the read address. The read address preferably is 29 most significant bits of a 32 bit address representing an aligned double word boundary. The read data word preferably includes 64 data bits. The read data word contains read data only after a read has been performed during the progression of these four words through the synchronous fixed latency loop. On a write operation these bits contain no information. As shown in FIG. 3, the read data input to data transfer bus interface 311 receives data from a fixed source. This could be all 0's, all 1's or any other fixed pattern which would be recognized as a lack of read data.

Figure 4:
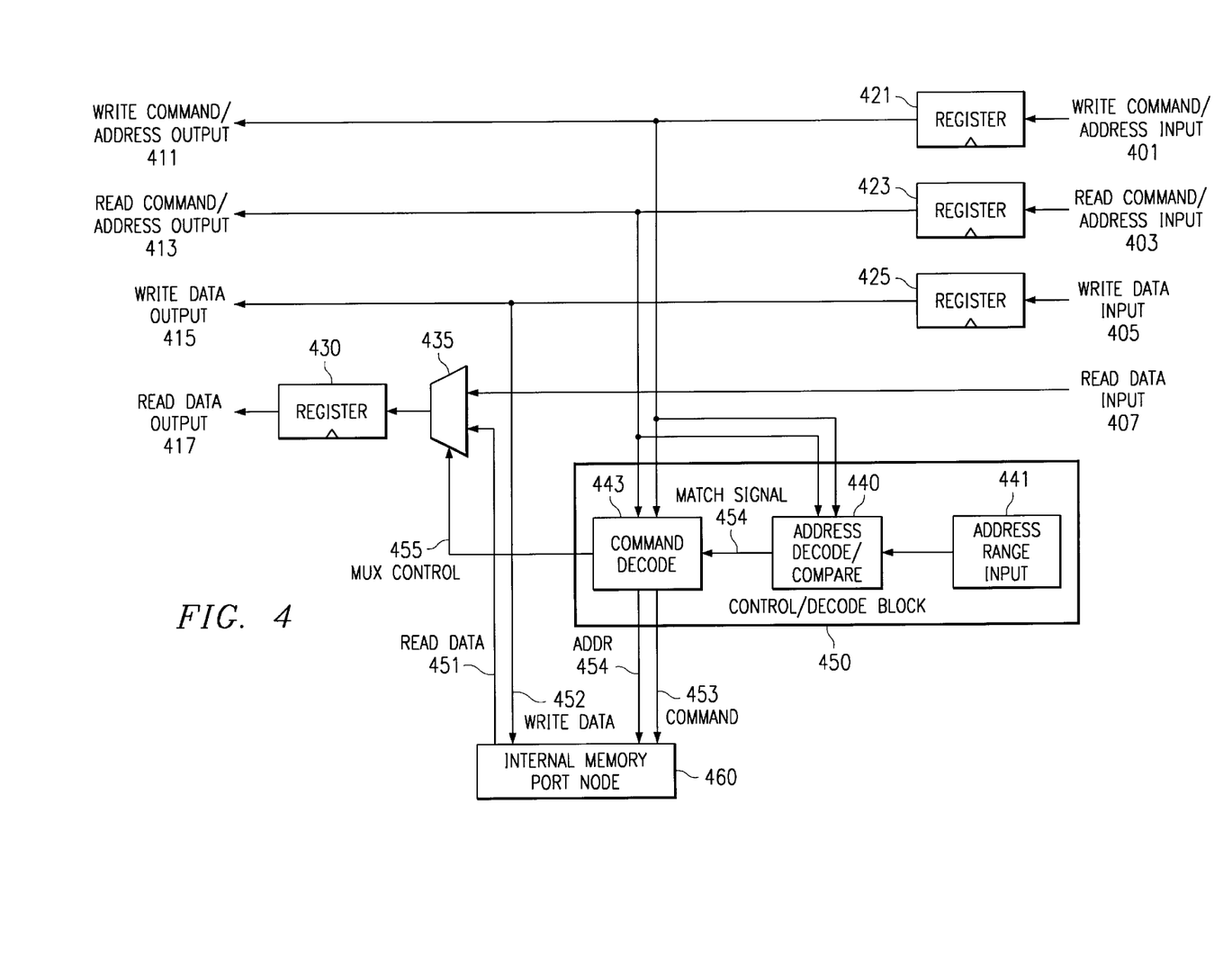
FIG. 4 illustrates a more detailed block diagram of the data transfer bus interface at a single internal memory port node.

FIG. 4 illustrates the structure of data transfer bus interface 311. The data transfer bus interfaces 311, 312, 313, 314, 315, 316, 317 and 318 are preferably identical. Data transfer bus interface 311 includes four inputs. The write command/address input 401 is latched into register 421 for one clock cycle. On the next clock cycle the write command/address word is output from data transfer bus interface via write command/address output 411. This output is connected to the write command/address data input 401 of the next data transfer bus interface in the loop. In the case of the last data transfer bus interface in the loop, such as data transfer bus interface 318 in FIG. 3, the write command/address word is discarded. Read command/address input 403 is latched in register 423 for one cycle and then supplied to the next node as read command/address output 413. In FIG. 4 write data is received on write data input 405 and similarly latched in register 425. The next clock cycle this write data is supplied to the next data transfer bus interface on write data output 415.

The read data word is received on read data input 407. This read data word is latched into register 430 for one clock cycle. The data transfer bus interface outputs a read data word each cycle on read data output 417. Depending upon the status of the data transfer bus interface the read data output could be the read data last received on read data input 407 or data recalled from the corresponding memory node 460 as selected by multiplexer 435.

Address comparator 440 is responsive to the address portion of the received write command/address word and the received read command/address wore. In conjunction with address range block 441, address comparator 440 determines if the either the just received write command/address word or the read command/address word requires action by the data transfer bus interface. In the preferred embodiment, each internal port memory node (301 through 308 in FIG. 3) is assigned a distinct subset of a unified address range. This subset address range is preferably fixed upon manufacture. Address range block 441 defines the address space subset of each memory node by specifying the most significant bits of the address. The least significant bits of the address define an address location within the local internal port memory node 460.

This is logically equivalent to parsing the address into a node number and a local address. Alternatively, address range block 441 could specify an address range by one or more upper and lower address bounds. Address comparator 440 would determine if the received address falls within an address range defined by a corresponding pair of upper and lower address bounds. The address bounds defined by address range block 441 could be permanently set upon manufacture. This could be done by mask programming a register, by a laser-programmed register or by a fuse or antifuse programmed register as known in the prior art. Alternatively, the address bounds could be writeable during operation using control register writes. The addresses of these control registers must have some known, fixed state upon initialization. Regardless of the manner of specifying the node address range, address comparator 440 generates a match signal 454 upon detection of a match between the received write address or the received read address and the corresponding node address range. This match signal will be active when the just received write command/address word or read command/address word requires action from the current memory node. As will be further discussed below, internal memory port node 300 is preferably constructed so that no write command/address word and read command/address word pair both attempt to access the same node.

The match signal from address comparator 440 supplies an enable input of a decoder 443. Decoder 443 is responsive to the command bits of the received write command/address word and read command/address word. These commands determine the action to be taken by the data transfer bus interface. Decoder 443 controls the action taken by data transfer bus interface by control of multiplexer 435 and the command portion 453 of a memory interface. If address comparator 440 does not generate the match signal, then decoder 443 controls multiplexer 435 to select the read data received on read data input 405 for storage in register 430. Decoder 443 controls command portion 453 of the memory interface 450 to be idle.

If address comparator 440 generates a match signal and decoder 443 detects a read operation, then decoder 443 controls a read operation. Decoder 443 also supplies the read address portion of the read command/address word to internal memory port node 460 via address 454. Decoder 443 controls the command portion 453 of memory interface to perform a read operation. This could, for example, be done by causing output of a R/W signal from command portion 453 of memory interface to memory 460 to indicate a read. Lastly, decoder 443 controls multiplexer 435 to select the output from the data portion 451 of memory interface for storage in register 430. Once stored in register 430, the just read data will be supplied to the next data transfer bus interface via read data output 417 on the next clock cycle.

Lastly, if address comparator 440 detects a match and decoder 443 determines that the just received write command/address word is a write operation into the memory at that node, the decoder 443 control a write operation. In this case decoder 443 controls multiplexer 435 to store in register 430, the just received read data on read data input 405. This stored read data will be output on read data output 417 the next clock cycle. Decoder 443 supplies the write address to internal memory port node 460 via address 454. Decoder 443 controls command portion 453 of the memory interface to indicate a write operation. Accordingly, the write data of the received write data word is written into memory 460 via write data 452 of the memory interface at the address indicated in the just received write command/address word stored in register 421. A summary of the operation of the data transfer bus interface is shown below in Table 1.

TABLE 1

| Address Comparator 440 | Decoder 443 | Mux 435 | Command 453 | Address 454 |
|---|---|---|---|---|
| no Match | — | Read Data Input 407 | Idle | — |
| Match | Read | Data Portion 451 | Read | Read Address |
| Match | Write | Read Data Input 407 | Write | Write Address |

In summary the synchronous fixed latency loop operates as follows. When internal memory port node master 300 issues a command to data transfer bus 255, the command flows around the entire loop, one data transfer bus node per cycle. Each data transfer bus node checks the address of each command to see if the command is in within its address range. If the address is outside the address range of the data transfer bus node, then the data transfer bus node ignores the command. If the address is within the address range of the data transfer bus node, then the node performs the command. If this command is a read, the memory node supplies the read data from the read address within internal memory port node 460 to the next data transfer bus node in the loop. The read data will then flow around the read path of the loop of data transfer bus 255 until it reaches routing unit 160 of the central transfer controller. If this command is a write, the memory interface node writes the received write data into a memory location of the memory corresponding to the received write address.

This invention is an improvement over the originally proposed fixed-latency loop bus architecture of U.K. Patent Application No. 9916705 entitled DATA BUS USING SYNCHRONOUS FIXED LATENCY LOOP. In the prior patent the control/address data path is shared for both read and write commands. Thus the bus is limited to a bandwidth of one half of what it could theoretically allow. That is, the transfer controller can issue only either a read or write command in each machine cycle, even though the separate read and write data paths would allow a simultaneous read and write command to be issued. The enhancement to the fixed-latency loop bus architecture of this invention adds a second control/address data path to the bus. Thus both a read and a write command can be issued at the same time.

The transfer controller must take care not to issue both a read and write command to the same node in the same cycle. In rare case this may not be explicitly necessary, but in general is a good rule that makes the system easy to design and verify. For example, a simultaneous read from a node memory while writing to the same node's control register can possibly be processed in parallel by the node. However, this in general should be avoided, as it requires the central transfer controller to have information about the node address space. Support for such special cases inherently limits the scalability of the architecture and should be avoided.

There are many methods that can be employed to prevent the transfer controller from issuing a simultaneous read and write command to the same node. The simplest method is for the transfer controller mechanism to support a simple prioritization scheme with a priority bit. This scheme works as follows. If a read and a write are detected to the same node in the same cycle, a bit is set in the transfer controller logic. Only one of the commands is allowed to be issued.

In this example, assume it is the read that is given priority. In the next machine cycle, the transfer controller detects that the bit is set, and the write is automatically issued. If a read is detected to the same node, it is held off for that cycle. The bit may be cleared once the write is sent. Alternatively, clearing of the bit may be qualified with the fact that a read was detected to the same node in the cycle in which the write was issued, such that the next occurrence of a conflict will give the write priority over the read. It is the read command which will be delayed by one cycle. This scheme is called 'jump ball' in reference to familiar alternating possession rules in basketball.

In either of the two bit-clearing/setting schemes above, the bandwidth of the loop is again limited to one half of its potential, since only one command can be issued per machine cycle. However, it should be pointed out that this type of conflicting operation is not the normal mode of operation. Recall that the transfer controller is utilized for all accesses by nodes outside of their own local space.

The most common type of transfer is across nodes, since moving data within a node by the transfer controller is seldom necessary. In this more common case, there will be no node conflicts detected and the memory transfer bandwidth of the loop is doubled over the original architecture.

Figure 5:
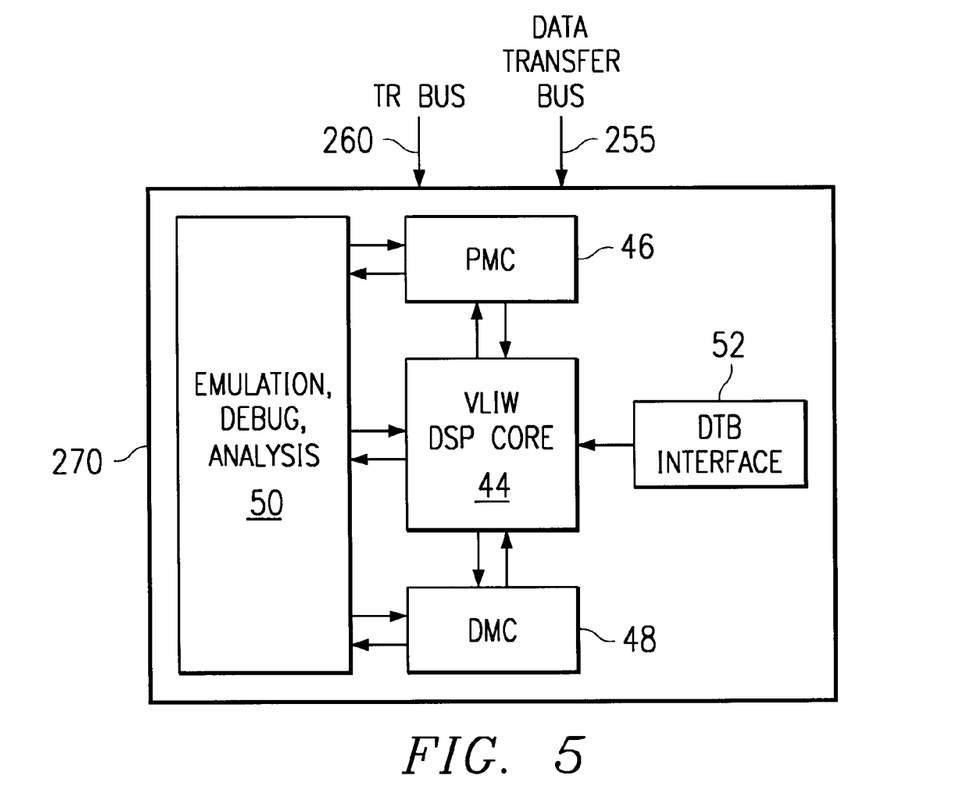
FIG. 5 illustrates a block diagram form an example of one of the multiple processors illustrated in FIGS. 2 and 3.

FIG. 5 illustrates a block diagram of an example of a preferred processor and cache memory combination implementing the internal memory nodes 270, 271 and 272 of FIG. 2 and 301 to 308 of FIG. 3. Each internal memory node 270, 271 and 272 preferably includes a digital signal processor core and corresponding instruction and data cache memory. Transfer controller with hub and ports 220 provides for all data communication among internal memory nodes 270, 271 and 272, external input/output (I/O) devices and peripherals at external ports 230 to 233, and internal memory at local memory port 260. Each internal memory node 270, 271 and 272 preferably comprises a very long instruction word (VLIW) digital signal processor core 44, program memory controller (PMC) 46, data memory controller (DMC) 48, an emulation, test, analysis and debug block 50, local memory and data transfer bus (DTB) interface 52. Internal memory nodes 270, 271 and 272 and transfer controller with hub and ports 220 communicate over a pair of high throughput buses. Transfer request feed mechanism 245 is used by digital signal processor cores 44 to specify and request transactions in transfer controller with hub and ports 220. Data transfer bus (DTB) 255 is used to load and store data from objects in the global memory map. While any given digital signal processor core 44 can access its own internal local memory within the cluster without permission from transfer controller with hub and ports 220, any access to global memory outside of its local memory requires a transfer controller directed data transfer, whether the access is to external memory or to another digital signal processor local memory. The overall architecture is scalable, allowing for the implementation of many internal memory nodes, although three is currently the preferred embodiment. It should be noted that architectural details, such as the number of digital signal processor cores, and their instruction set architectures are not essential to the invention. This microprocessor architecture is exemplary only, and the invention is applicable to many microprocessor architectures.

Figure 6:
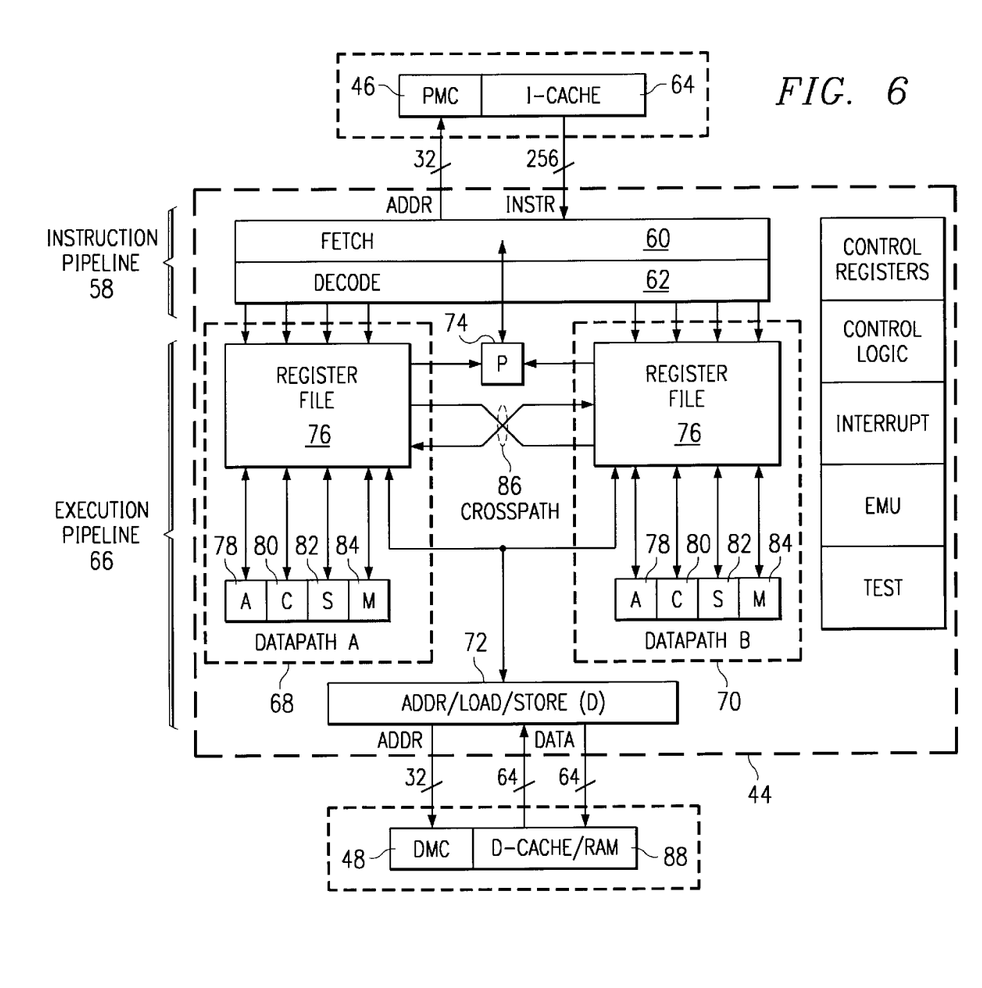
FIG. 6 illustrates further details of the very long instruction word digital signal processor core illustrated in FIG. 5.

FIG. 6 is a block diagram illustrating more detail of digital signal processor core 44 illustrated in FIG. 5. Digital signal processor core 44 is a 32-bit eight-way VLIW pipelined processor. The instruction set consists of fixed length 32-bit reduced instruction set computer (RISC) type instructions that are tuned for digital signal processing applications. Almost all instructions perform register-to-register operations and all memory accesses are performed using explicit load/store instructions. As shown in FIG. 6, instruction pipeline 58 consists of fetch stage 60 and decode stage 62. Fetch stage 60 retrieves program codes into the processor core from instruction cache 64 under control of program memory controller 46 in groups of eight instructions called a fetch packet. Decode stage 62 parses the fetch packet, determines parallelism and resource availability and constructs an execute packet of up to eight instructions. Each instruction in the execute packet is then translated into control signals to drive the appropriate units in execution pipeline 66. Execution pipeline 66 consists of two symmetrical data paths, data path A 68 and data path B 70, a common 64-bit load/store unit group D-unit group 72, and a common branch unit group P-unit group 74. Each data path contains 32-word register file (RF) 76, and four execution unit groups, A-unit group 78, C-unit group 80, S-unit group 82, and M-unit group 84. Overall there are ten separate unit groups in execution pipeline 66. Eight of these units may scheduled concurrently every cycle. Each functional unit group contains plural functional units, some of which are duplicated between unit groups. In total there are nine 32-bit adders, four 32-bit shifters, three boolean operators, and two 32 bit by 16 bit multipliers. The multipliers are each configurable into two 16 bit by 16 bit multipliers or into four 8 bit by 8 bit multipliers. The memory at internal memory nodes 270, 271 and 272 is preferably partitioned between instruction cache memory 64 controlled via program memory controller 46 and data cache memory and random access memory 88 controlled via data memory controller 48. These memory partitions are employed by digital signal processor core 44 in a conventional manner.

Each digital signal processor core 44 may request data transfers in is several ways. Digital signal processor core 44 may issue a data transfer request to transfer controller with hub and ports 220 in response to an explicit data transfer instruction. The data transfer instruction must specify the data source, the data destination and the data amount. These specifications may be by immediate fields in the instructions or by parameters stored in registers or memory. It is preferable that each digital signal processor core 44 be capable of requesting any data transfer that can be serviced by transfer controller with hub and ports 220. Thus any digital signal processor core 44 may transfer data internally or externally and load or read any internal memory node.

Each digital processor core 44 preferably also includes automatic mechanisms for generating requests for data transfer for cache service. Thus an instruction cache miss preferably causes program memory controller 46 to generate a data transfer request from another data source to fill a line of instruction cache 64 with data including program instructions stored at the address generating the cache miss. Similarly, a data cache miss on a data read preferably causes data memory controller 48 to generate a data transfer request to retrieve data to fill a line in data cache/random access memory 88 with corresponding data. These instruction and data are stored in a higher level of memory. This higher level of memory may be an on-chip combined cache used by all digital signal processor cores 44 or it may be external to the multiprocessor integrated circuit. There are two alternatives for data cache misses on data writes. In a write through mode, a data write by digital processor core 44 that misses data cache/random access memory 88 causes data memory controller 48 to generate a data transfer request to store the write data in the appropriate location in a higher level of memory. In a writeback mode, a data write by digital processor core 44 that misses data cache/random access memory 88 causes data memory controller 48 to generate a data transfer request to recall corresponding data in the appropriate location from a higher level of memory for storage in data cache/random access memory 88. The write data is then written into data cache/random access memory 88 overwriting the corresponding data just recalled from the higher level of memory. This process is referred to as write allocation within the data cache.

Data memory controller 48 preferably also employs a data transfer request to handle data writeback to a higher level memory upon cache eviction of a dirty entry. A dirty cache entry includes data that has been modified since it was recalled from a higher level of memory. This modified data corresponds to a later state of the program than the data stored in the higher level of memory. When such data must be replaced to make room for new cache data, referred to as cache eviction, this dirty data must be written back to the higher level of memory to maintain the proper program state. Transfer controller with hub and ports 220 is preferably employed for this writeback of evicted dirty cache entries.

Note that the foregoing description assumes a one cycle latency for reads or writes into the memory attached to the internal memory port nodes. Single cycle read/write latency is not required for proper operation of the loop. Advantageous fixed read latency is achieved so long as the delay in each internal memory port node is the same. Such fixed read latency is desirable to enable a straightforward implementation of data tagging. Read data is always received in a fixed number of cycles following the read command. The loop structure guarantees against read data collision because the read data is received from respective addressed nodes in the same order as the read commands. Note further that a write command to any particular internal memory port node have the same latency as a read command to that node. Thus if internal memory port node master 300 issues a read command followed by a write command in the next cycle or a write command followed by a read command in the next cycle to the same address the returned read data is always proper. The loop insures that the respective read and write command reach each node in the order issued, thus the proper read data is returned. Thus all the advantages of this invention flow from a fixed interval at each node regardless of whether it is one or more clock cycles.

Significant utility results even if the delay at each internal memory port node is nonuniform or variable. Because the read command and the read data must follow the entire loop, read data is always returned to internal memory port node master 300 in the same order as it issues read commands. Each node need only handle commands in the order received without allowing a later command to cross an earlier command. Thus while the latency may be variable, the order of returned read data remains fixed even for nonuniform or variable delay at the nodes. Because the same path is used for read commands and write commands to any node, read and write commands to the same node arrive in the order issued by internal memory port node master 300. Thus internal memory port node master 300 need take no precautions for proper data return for read/write command pair or a write/read command pair to the same address. These features are not dependent upon critical timing but flow from the nature of the loop structure.

In conclusion, the single address fixed latency loop bus architecture is a highly scaleable bus for multi-node applications. While extremely modular, architecturally the fixed latency loop is limited to one half its theoretical bandwidth due to the sharing of a single command bus across separate read and write data paths. By adding a second command data path for read and write commands as in the two address fixed latency loop, the bandwidth of the loop can be doubled for the best and most common cases.

The refined two address fixed latency loop of this invention performs at the same level as the original architecture in the worst case. In order to support this added bus, the centralized controller must ensure that simultaneous commands across the two control busses are not directed at the same node. A simple prioritization scheme between reads and writes will provide this.

What is claimed is:

1. A method of data transfer among a plurality of nodes comprising the steps of:

initializing transfer operations from a master node, said initializing including         generating a read command including an indication of one of the plurality of nodes and a read memory address,         generating a write command including an indication of one of the plurality of nodes, write data and a write memory address;

disposing the plurality of nodes in closed loop having a first node and a last node;

passing a received read command and a received write command from each node to a next node in said closed loop, the first node of the plurality of nodes receiving said read command and said write command generated by the master node;

determining at each node whether a read command received from a prior node includes an indication of one of the plurality of nodes corresponding to that node, if so recalling data from a memory at an address corresponding to said read memory address of said read command and passing said read data to said next node in said closed loop, the last node of said plurality of nodes passing said read data to the master node; and determining at each node whether a write command received from a prior node includes an indication of one of the plurality of nodes corresponding to that node, if so writing the write data of said write command to a memory at said write address corresponding to said memory address of said read command and passing said write command to said next node in said closed loop.

2. The method of claim 1, wherein:

said step of generating a read command including an indication of one of the plurality of nodes generates a node number;

said step of generating a write command including an indication of one of the plurality of nodes generates a node number;

said method further includes assigning a unique node number to each of said plurality of nodes; and said step of determining whether a read command includes an indication of one of the plurality of nodes corresponding to that node includes determining if said node number of said read command corresponds to said node number assigned to that node; and said step of determining whether a write command includes an indication of one of the plurality of nodes corresponding to that node includes determining if said node number of said write command corresponds to said node number assigned to that node.

3. The method of claim 1, wherein:

said step of generating a read command including an indication of one of the plurality of nodes generates a memory address within a unified address space;

said step of generating a write command including an indication of one of the plurality of nodes generates a memory address within a unified address space;

said method further includes assigning a unique subset of said unified address space to each of said plurality of nodes; and said step of determining whether a read command includes an indication of one of the plurality of nodes corresponding to that node includes determining if said read memory address of said read command corresponds to said unique subset of said unified address space assigned to that node; and said step of determining whether a write command includes an indication of one of the plurality of nodes corresponding to that node includes determining if said write memory address of said write command corresponds to said unique subset of said unified address space assigned to that node.

4. The method of claim 3, wherein:

said step of assigning a unique subset of said unified address space to each of said plurality of nodes includes assigning a unique coding of a predetermined number of most significant bits of said memory address;

said step of determining whether a read command includes an indication of one of the plurality of nodes corresponding to that node includes determining if said predetermined number of most significant bits of said memory address of said read command corresponds to said unique coding assigned to that node; and said step of determining whether a write command includes an indication of one of the plurality of nodes corresponding to that node includes determining if said predetermined number of most significant bits of said write memory address of said write command corresponds to said unique coding assigned to that node.

5. The method of claim 3, wherein:

said step of assigning a unique subset of said unified address space to each of said plurality of nodes includes assigning a unique address range of said memory address;

said step of determining whether a read command includes an indication of one of the plurality of nodes corresponding to that node includes determining if said read memory address of said read command is included within said unique address range assigned to that node; and said step of determining whether a write command includes an indication of one of the plurality of nodes corresponding to that node includes determining if said wrote memory address of said write command is included within said unique address range assigned to that node.

6. The method of claim 1, further comprising:

supplying to said first node constant read data.

7. The method of claim 6, wherein:

said step of supplying said first node constant read data supplies read data consisting of all 1's.

8. The method of claim 6, wherein:

said step of supplying said first node constant read data supplies read data consisting of all 0's.

9. The method of claim 1, wherein:

discarding at said last node said read command including said indication of one of said plurality of nodes and said read memory address following determining at said last node whether said read command includes an indication of one of the plurality of nodes corresponding to the last node and if so recalling data from a memory at an address corresponding to said read memory address of said read command and passing said read data to said master node.

10. The method of claim 1 further comprising the steps of:

discarding at said last node said write command including said indication of one of said plurality of nodes, said write data and said write memory address following determining at said last node whether said write command includes an indication of one of the plurality of nodes corresponding to the last node and if so writing the write data of said write command to a memory at an address corresponding to said write memory address of said write command.

11. The method of claim 1 further comprising the step of:

prohibiting generation in a single cycle of a read command including an indication of one of the plurality of nodes and a write command including an indication of said one of the plurality of nodes.

12. A data processing apparatus comprising:

a plurality of memory nodes disposed in a closed loop having a first memory node and a last memory node;

a master node capable of initializing data transfer operations by generation of a read command including an indication of one of said plurality of memory nodes, a read memory address, a write command including an indication of one of said plurality of memory nodes, a write memory address and write data;

each of said plurality of memory nodes having a memory having a read address input, a read data output, a write address input and a write data input, said memory outputting data stored therein at an addressed memory location corresponding to a read address received at said read address input in response to a read command and storing data at an addressed memory location corresponding to a write address at said write address input in response to a write command, a read command input for receiving a read command from a prior memory node in said closed loop, said first memory node receiving said read command generated by said master node;

a read command output for supplying received read command to a next memory node in said closed loop, said read command output of said last memory node not connected, a read data input for receiving read data from a prior memory node in said closed loop, a read data output for supplying read data to a next memory node in said closed loop, said last memory node supplying read data to said master node, a write command input for receiving a write command from a prior memory node in said closed loop, said first memory node receiving said write command generated by said master node, a write command output for supplying received write command to a next memory node in said closed loop, said write command output of said last memory node not connected, a write data input for receiving write data from a prior memory node in said closed loop, a write data output for supplying write data to a next memory node in said closed loop, said write data output of said last memory node not connected, an address comparator generating a match signal upon detection that a received read command includes a read address corresponding to a unique address range assigned to said memory node or that at received write command includes a write address corresponding to said unique address range assigned to said memory node, a multiplexor having a first input connected to said read data input, a second input connected to a data output of said memory and an output connected to said read data output, said multiplexor selectively connecting either said first input or said second input to said output, a command decoder connected to said memory, said address comparator, and said multiplexor, said command decoder supplying said received read address to said address input of said memory and controlling said multiplexor to connect said second input to said output responsive to a received read command upon receipt of said match signal, and supplying said received write address to said address input of said memory and controlling said multiplexor to connect said first input to said output responsive to a received read command upon receipt of said match signal.

13. The data processing apparatus of claim 12, wherein:

each read command includes an indication of one of the plurality of memory nodes by a node number;

each write command includes an indication of one of the plurality of memory nodes by a node number; and said address comparator detects whether said node number of said received read command or of said received write command corresponds to a unique node number assigned to said memory node.

14. The data processing apparatus of claim 12, wherein:

each of said plurality of memory nodes store data at memory locations within a unified address space; and said address comparator detects whether said read command includes a read memory address or said write command includes a write memory address within a unique subset of said unified address space assigned to that memory node.

15. The data processing apparatus of claim 14, wherein:

said address comparator detects whether said read command includes a read memory address or said write command includes a write memory address having a predetermined number of most significant bits corresponding to a unique coding assigned to that memory node.

16. The data processing apparatus of claim 14, wherein:

each of said plurality of memory nodes further includes an address range block defining a unique address range within said unified address space; and said address comparator is connected to said corresponding address range block and detects whether said read command includes a read memory address or said write command includes a write memory address included within said unique address range of said address range block.

17. The data processing apparatus of claim 12, further comprising:

a constant read data source connected to said read data input of said first memory node supplying predetermined constant read data.

18. The data processing apparatus of claim 17, wherein:

said constant read data source supplies said predetermined constant read data consisting of all 1's.

19. The data processing apparatus of claim 17, wherein:

said constant read data source supplies said predetermined constant read data consisting of all 0's.

20. The data processing apparatus of claim 12, wherein:

each of said memory nodes further includes a data processor.

21. The data processing apparatus of claim 12, wherein:

said master node and each of said plurality of memory nodes are embodied in a single integrated circuit.

* * * * *